United States Patent
Najafi Ashtiani et al.

(10) Patent No.: US 12,461,681 B2
(45) Date of Patent: Nov. 4, 2025

(54) FINE-GRAINED CLOCKING AND CLOCK DISTRIBUTION IN LOW POWER DOUBLE DATA RATE PHYSICAL LAYER INTERFACE

(71) Applicants: Advanced Micro Devices, Inc, Santa Clara, CA (US); ATI Technologies ULC, Markham (CA)

(72) Inventors: Pouya Najafi Ashtiani, Toronto (CA); Anwar Parvez Kashem, Sudbury, MA (US); Kapil Acharya, Bangalore (IN); Mahanth Kumar Gurram, Bengaluru (IN)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 18/390,853

(22) Filed: Dec. 20, 2023

(65) Prior Publication Data
US 2025/0208788 A1    Jun. 26, 2025

(51) Int. Cl.
*G06F 3/06* (2006.01)
(52) U.S. Cl.
CPC ............ *G06F 3/0656* (2013.01); *G06F 3/061* (2013.01); *G06F 3/0673* (2013.01)

(58) Field of Classification Search
CPC ....... G06F 3/0656; G06F 3/061; G06F 3/0673
See application file for complete search history.

(56) References Cited

U.S. PATENT DOCUMENTS

| | | | |
|---|---|---|---|
| 6,530,006 B1* | 3/2003 | Dodd | G06F 13/4239 710/52 |
| 2008/0239832 A1* | 10/2008 | Ko | G11C 5/005 365/189.05 |
| 2011/0050320 A1* | 3/2011 | Gillingham | H01L 24/03 327/365 |
| 2020/0152258 A1* | 5/2020 | Ware | G11C 11/4093 |
| 2022/0011934 A1* | 1/2022 | Tatapudi | G11C 7/222 |
| 2023/0335181 A1* | 10/2023 | Kim | G11C 7/1039 |
| 2023/0410879 A1* | 12/2023 | Miyamoto | G11C 7/109 |

* cited by examiner

*Primary Examiner* — Edward J Dudek, Jr.
(74) *Attorney, Agent, or Firm* — FIG. 1 Patents (57) ABSTRACT

A system includes a memory device and a memory controller operatively connected to the memory device via a physical layer interface (PHY). The PHY includes an active first-in-first-out (FIFO) buffer configured to receive commands from the memory controller. The PHY also includes one or more on-demand FIFO buffers configured to be selectively enabled by the active first-in-first-out buffer to handle a data payload. The system ensures efficient power usage by gating clocks and clock distribution to the one or more on-demand FIFO buffers.

20 Claims, 5 Drawing Sheets

FINE-GRAINED CLOCKING AND CLOCK DISTRIBUTION IN LOW POWER DOUBLE DATA RATE PHYSICAL LAYER INTERFACE

BACKGROUND

Different components of a system-on-chip, or SoC may operate at different frequencies depending on their performance requirements. For instance, a processing unit might run at a high frequency, while a low-power peripheral component might operate at a much lower frequency. Additionally, an external memory might operate at a different frequency than the internal components of the SoC. These varying frequencies lead to the creation of multiple clock domains within the memory subsystem. Each clock domain can be optimized at different rates to balance power consumption and performance. To ensure proper data transfer between these domains, special circuitry and techniques are implemented to handle clock domain crossing. This ensures that data and control signals transition reliably between different clock domains without glitches or stability issues.

DETAILED DESCRIPTION

Overview

The presence of multiple clock domains and the distinction between command and data paths emphasize the need to cater to diverse performance needs, handle complex synchronization challenges, and ensure robust, high-speed data access within modern SoCs. Achieving dynamic low power consumption without affecting performance and user experience is key to extending the battery life of battery-powered devices that utilize modern SoCs.

Mechanisms exist to turn off the clock signal to parts of a circuit when these parts are not in use. In memory systems, this means that the clock signal is provided only when the memory operations are actually occurring. When the memory is idle or a particular part of the memory circuit is not being used, the clock signal to that part is "gated off" or disabled. One such mechanism is defined in double data rate (DDR) physical layer interface (DFI), which is an industry specification that simplifies and defines a standard interface between memory controllers and the physical layer interface within a memory subsystem. Clock gating is implemented in DFI to manage the clock signals that are provided to various components of the memory interface, such as the memory controller, the data paths, or other parts of the physical layer interface. The granularity of clock gating in DFI is only available at the control and data paths. This limits the potential power savings offered by current clock gating efforts.

Fine-grained clocking and clock distribution in low power double data rate physical layer interface is described. In one or more implementations, a memory device and a memory controller are connected by a physical layer interface. The physical layer interface includes an active first-in-first-out buffer configured to receive commands from the memory controller. The physical layer interface also includes an on-demand first-in-first-out buffer configured to be selectively enabled by the active first-in-first-out buffer to handle a data payload received from the memory controller.

The described techniques enable systems, such as SoCs, with multiple clock domains at different frequencies to achieve very fine grain clock gating, thereby hitting desired targets in power, performance, and area. This is achieved by subdividing the data path into hierarchical dependent logic portions, implementing cascading first-in-first-out buffers to control clock gaters, and implementing read-side clock gate controls with programmable/trainable windows. This integrated approach ensures effective and adaptable clock gating across different clock domains within a system, which reduces power consumption and improved overall memory system efficiency.

In some aspects, the techniques described herein relate to a system including: a memory device; a memory controller; and a physical layer interface that connects the memory device and the memory controller, the physical layer interface including: an active first-in-first-out buffer configured to receive commands from the memory controller; and an on-demand first-in-first-out buffer configured to be selectively enabled by the active first-in-first-out buffer to handle a data payload received from the memory controller.

In some aspects, the techniques described herein relate to a system, wherein the active first-in-first-out buffer is powered when the system is powered-on.

In some aspects, the techniques described herein relate to a system, wherein the on-demand first-in-first-out buffer is disabled until enabled by the active first-in-first-out buffer.

In some aspects, the techniques described herein relate to a system, wherein the physical layer interface further includes a plurality of on-demand first-in-first-out buffers including the on-demand first-in-first-out buffer.

In some aspects, the techniques described herein relate to a system, wherein an output of the active first-in-first-out buffer enables a clock signal for one or more of the plurality of on-demand first-in-first-out buffers.

In some aspects, the techniques described herein relate to a system, further including a phase locked loop configured to generate the clock signal.

In some aspects, the techniques described herein relate to a system, wherein the physical layer interface is configured to, responsive to determining that the data payload is associated with a write operation, cause the active first-in-first-out buffer to enable a write data sub-group of first-in-first-out buffers configured to handle write requests, the write data sub-group of first-in-first-out buffers including the on-demand first-in-first-out buffer.

In some aspects, the techniques described herein relate to a system, wherein the physical layer interface is configured to, responsive to determining that the data payload is associated with a read operation, cause the active first-in-first-out buffer to enable a read data sub-group of first-in-first-out buffered configured to handle read requests, the read data sub-group of first-in-first-out buffers including the on-demand first-in-first-out buffer.

In some aspects, the techniques described herein relate to a system, wherein the memory device includes a low power double data rate dynamic random-access memory device, and wherein the memory controller is connected to the physical layer interface via a double data rate to physical layer interface.

In some aspects, the techniques described herein relate to a physical layer interface including: an active first-in-first-out buffer configured to receive commands from a memory controller; and an on-demand first-in-first-out buffer configured to be selectively enabled by the active first-in-first-out buffer to handle a data payload received from the memory controller.

In some aspects, the techniques described herein relate to a physical layer interface, wherein the active first-in-first-out buffer is constantly powered.

In some aspects, the techniques described herein relate to a physical layer interface, wherein the on-demand first-in-first-out buffer is powered only when enabled by the active first-in-first-out buffer.

In some aspects, the techniques described herein relate to a physical layer interface, further including a plurality of on-demand first-in-first-out buffers including the on-demand first-in-first-out buffer, and wherein an output of the active first-in-first-out buffer enables a clock signal for one or more of the plurality of on-demand first-in-first-out buffers.

In some aspects, the techniques described herein relate to a physical layer interface, wherein the active first-in-first-out buffer is further configured to: enable a write data sub-group of first-in-first-out buffers configured to handle write requests, the write data sub-group of first-in-first-out buffers including the on-demand first-in-first-out buffer; or enable a read data sub-group of first-in-first-out buffered configured to handle read requests, the read data sub-group of first-in-first-out buffers including the on-demand first-in-first-out buffer.

In some aspects, the techniques described herein relate to a method including: defining a sideband clock group, a command clock group, and a data clock group within an interface between a memory controller and a physical layer component; monitoring, by the physical layer component, sideband signals received from the memory controller within the sideband clock group; selectively enabling the command clock group when the memory controller sends a memory command to the physical layer component; and selectively enabling the data clock group when the memory controller writes a data payload to a memory device.

In some aspects, the techniques described herein relate to a method, wherein selectively enabling the data clock group when the memory controller writes the data payload to the memory device includes selectively enabling a write data sub-group within the data clock group, the write data sub-group including one or more on-demand first-in-first-out buffers.

In some aspects, the techniques described herein relate to a method, further including selectively enabling the data clock group when the memory controller reads the data payload from the memory device.

In some aspects, the techniques described herein relate to a method, wherein selectively enabling the data clock group when the memory controller reads the data payload to the memory device includes selectively enabling a read data sub-group within the data clock group, the read data sub-group including one or more on-demand first-in-first-out buffers.

In some aspects, the techniques described herein relate to a method, wherein the memory device includes a low power double data rate dynamic random access memory device.

In some aspects, the techniques described herein relate to a method, wherein the interface includes a double data rate to physical layer interface.

Figure 1:
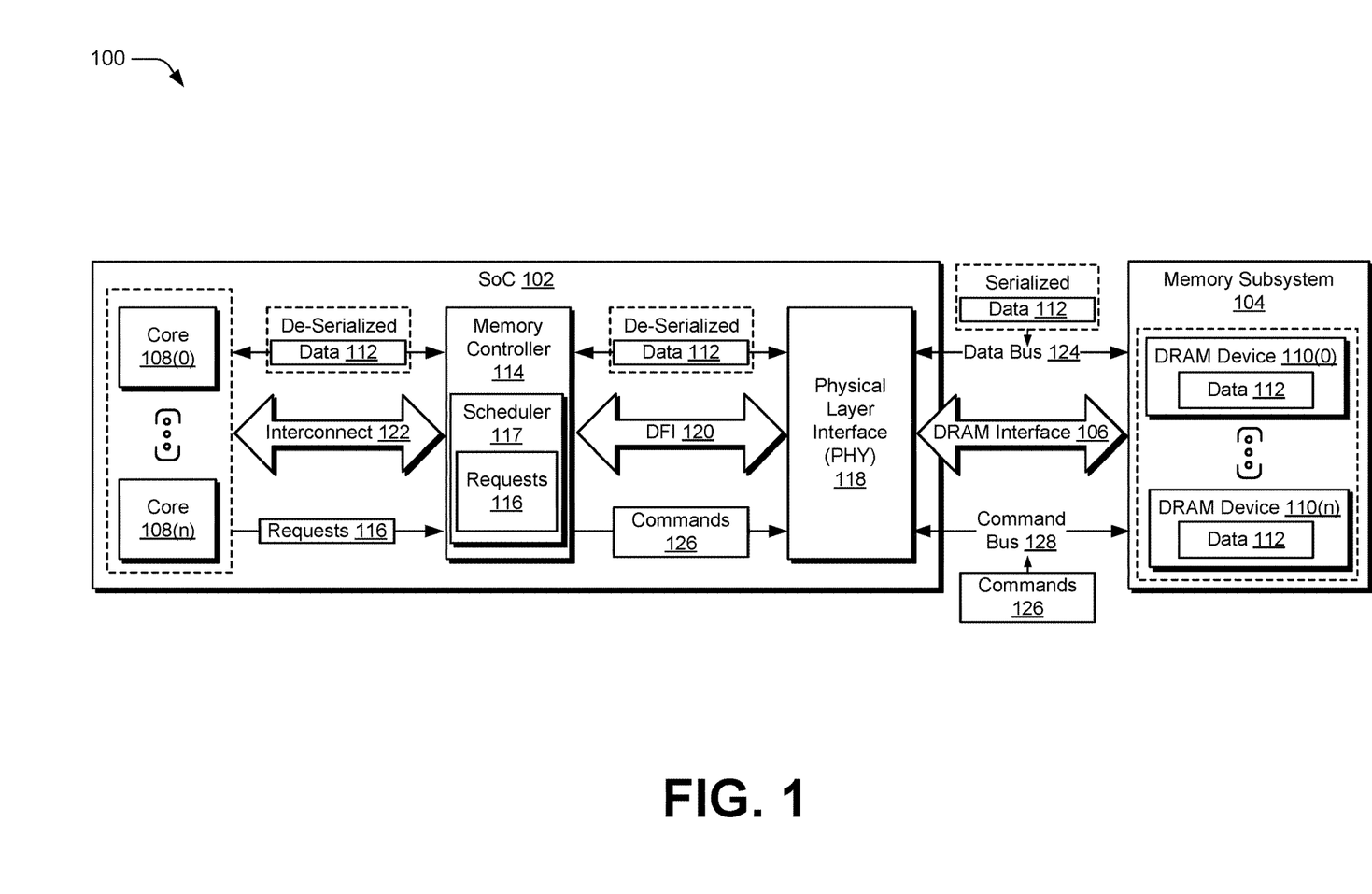
FIG. 1 is a block diagram of a non-limiting example system having a System-On-Chip including one or more cores, a memory controller, a physical layer interface, and a memory subsystem including one or more memory devices.

FIG. 1 is a block diagram of a non-limiting example system 100. The illustrated system 100 includes a SoC 102 and a memory subsystem 104, where the SoC 102 and the memory subsystem 104 are communicatively coupled via a dynamic random access memory (DRAM) interface 106. In one or more implementations, the SoC 102 includes at least one core 108. In some implementations, the SoC 102 includes multiple cores 108. For instance, in the illustrated example, the SoC 102 is depicted as including core 108(0) and core 108(n), where n represents any integer. The memory subsystem 104 includes at least one DRAM device 110. In some implementations, the memory subsystem 104 includes multiple DRAM devices 110. For instance, in the illustrated example, the memory subsystem 104 is depicted as including DRAM device 110(0) and DRAM device 110(n), where n represents any integer.

In accordance with the described techniques, the SoC 102 and the memory subsystem 104 are coupled to one another via a wired and/or wireless connection, which is depicted in the illustrated example of FIG. 1 as the DRAM interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, and other computing devices or systems.

The SoC 102 is an electronic circuit that performs various operations on and/or using data 112 stored in the memory subsystem 104. Examples of the SoC 102 and/or the core 108 of the SoC 102 include, but are not limited to, a central processing unit (CPU), a graphics processing unit (GPU), a field programmable gate array (FPGA), an accelerated processing unit (APU), and a digital signal processor (DSP). For example, in one or more implementations, a core 108 is a processing unit that reads and executes instructions (e.g., of a program), examples of which include to add the data 112, to move the data 112, and/or to branch the data 112.

In one or more implementations, the memory subsystem 104 is a circuit board (e.g., a printed circuit board), on which the one or more DRAM devices 110 are mounted. Examples of the DRAM devices 110 include, but are not limited to, a single in-line memory module (SIMM), a dual in-line memory module (DIMM), small outline DIMM (SODIMM), microDIMM, load-reduced DIMM, registered DIMM (R-DIMM), non-volatile DIMM (NVDIMM), high bandwidth memory (HBM), and the like. In one or more implementations, the memory subsystem 104 is a single integrated circuit device that incorporates the DRAM devices 110 on a single chip. In some examples, the memory subsystem 104 is composed of multiple chips that implement the DRAM devices 110 as vertical ("3D") stacks, placed side-by-side on an interposer or substrate, or assembled via a combination of vertical stacking and side-by-side placement.

The memory subsystem 104 is used to store information, such as the data 112, for immediate use by the SoC 102 (e.g., by one or more of the cores 108). In one or more implementations, the memory subsystem 104 corresponds to semiconductor memory where the data 112 is stored within memory cells on one or more integrated circuits. In at least one example, the memory subsystem 104 corresponds to or includes volatile memory, examples of which include random-access memory (RAM), dynamic random-access memory (DRAM), synchronous dynamic random-access memory (SDRAM) (e.g., single data rate (SDR) SDRAM or double data rate (DDR) SDRAM), ferroelectric RAM (Fe-RAM), resistive RAM (RRAM), a spin-transfer torque magnetic RAM (STT-MRAM), and static random-access memory (SRAM). The concepts and technologies disclosed herein will be described in context of the DRAM devices 110 implemented as low power DDR (LPDDR) DRAM devices on one or more integrated circuits of the memory subsystem 104. Those skilled in the art will appreciate aspects of the concepts and technologies disclosed herein that are applicable to other memory hardware configurations.

The SoC 102 is further depicted as including a memory controller 114. The memory controller 114 manages flow of the data 112 between the core(s) 108 and the memory subsystem 104. The memory controller 114 handles requests 116 from the core(s) 108 and/or other devices (e.g., peripheral devices) to read from and/or write to the memory subsystem 104. Although depicted in the example system 100 as being implemented as part of the SoC 102, in some alternative implementations, the memory controller 114 is implemented separately from the SoC 102.

In accordance with one or more implementations, the memory controller 114 is associated with a single channel of the memory subsystem 104. For instance, the system 100 is configured to include a plurality of different memory controllers 114 on the same or different SoCs 102, one for each of a plurality of channels of the memory subsystem 104. The techniques described herein are thus performable using a plurality of different memory controllers 114 to schedule the requests 116 for different channels of the memory subsystem 104. In some implementations, a single channel in the memory subsystem 104 is allocated into multiple pseudo-channels. In such implementations, the memory controller 114 is configured to schedule the requests 116 for different pseudo-channels of a single channel in the memory subsystem 104.

As depicted in the illustrated example of FIG. 1, the memory controller 114 includes a scheduler 117. The scheduler 117 is representative of a digital circuit configured to schedule the requests 116 for execution in a manner that optimizes performance of the system 100 (e.g., limits computational resource consumption, decreases latency, and reduces power consumption of the system 100) when measured over execution of the requests 116. The scheduler 117 includes a request queue (not shown) that is configured to maintain a queue of the requests 116 received at the memory controller 114 from the core(s) 108.

The memory controller 114 decodes memory addresses to determine to which memory bank, row, and column the memory addresses correspond. The memory controller 114 ensures that the correct location in the memory subsystem 104 is accessed for each of the requests 116.

Different memory technologies (e.g., DDR SDRAM) have specific command sequences for operations such as read, write, and refresh. The memory controller 114 issues these commands in the correct order, taking care to observe all timing constraints specified by the memory standard.

The memory controller 114 includes FIFO queues to handle the data 112 flowing to and from the memory subsystem 104. This helps in managing the data 112 flow, especially when there is a speed mismatch between the memory subsystem 104 and the requesting device (e.g., the core(s) 108).

The memory controller 114 manages the memory bus, ensuring that only one device accesses the bus at a given time. Management of the memory device, in some implementations, involves arbitration among multiple devices (e.g., CPU, GPU, or DMA controller) that are trying to access the memory subsystem 104 concurrently.

Technologies like DRAM use periodic refresh cycles to maintain the integrity of stored data 112. The memory controller 114 manages these refresh cycles, ensuring that refresh cycles occur at regular intervals without disrupting ongoing read/write operations.

In some implementations, the memory controller 114 supports error checking and correction (ECC) to detect and correct memory errors. This involves generating ECC codes for the data 112 when writing to the memory subsystem 104 and checking the ECC codes when reading the data 112 from the memory subsystem 104 to identify and rectify errors.

The memory controller 114 also performs tasks related to clock and power management. The memory controller 114 manages the clock signals for the memory subsystem 104, ensuring the data 112 is read/written at the correct times. The memory controller 114 uses dynamic power management techniques, such as activating low-power modes during periods of inactivity, to reduce power usage and increase battery life in battery-powered systems and devices.

Upon startup, or when new memory (e.g., a new DRAM device 110) is added to the memory subsystem 104, the memory controller 114 conducts initialization sequences. For example, for high-speed interfaces, training routines (like read or write leveling, gate training, and/or the like) are executed to calibrate timings and optimize signal integrity.

In some implementations, the DRAM device(s) 110 in the memory subsystem 104 have multiple banks and/or ranks to improve parallelism and performance. The memory controller 114 manages operations across the memory banks to ensure optimal utilization and performance.

The memory controller 114 interfaces with a DDR physical layer (PHY) 118 via a DDR-PHY interface (DFI) 120. The DFI 120 is a specification that defines a standard interface between DDR memory controllers (e.g., the memory controller 114) and the physical layer (e.g., the PHY 118). The PHY 118 enables the memory controller 114 to interface with the DRAM device(s) 110 and handles the physical and electrical characteristics of signals. The memory controller 114 handles higher-level memory access operations, such as command sequencing, arbitration, refresh, and data buffering. The PHY 118, on the other hand, is responsible for the electrical interface to the DRAM device(s) 110, including driving signals onto memory buses, receiving signals from the DRAM device(s) 110, and managing aspects related to signal integrity and timing.

The memory controller 114 and the core(s) 108 are shown operatively connected via an interconnect 122. The interconnect 122 is an interface that manages the transfer of data, addresses, and control signals between the core(s) 108 and the memory controller 114. In some implementations, the interconnect 122 is or includes a data fabric. In these implementations, the data fabric also facilitates communication among the core(s) 108, including communication with shared cache (not shown). In some implementations, the interconnect 122 implemented as a data fabric facilitates communication among multiple core complexes (CCXs) within a core chiplet die (CCD). The interconnect 122, in some implementations, is configured to incorporate the DFI 120 and/or the DRAM interface 106.

In the illustrated example, the data 112 originating from the core(s) 108 and to be written to the DRAM device(s) 110 is de-serialized for communications between the core(s) 108 and the memory controller 114, and also between the memory controller 114 and the PHY 118. The PHY 118, in the illustrated example, serializes the data 112 before sending the data 112 over the DRAM interface 106 via a data bus 124 to the memory subsystem 104. In the reverse, the data 112 to be read from the DRAM device(s) 110 is serialized for transfer over the DRAM interface 106 via the data bus 124 to the PHY 118, which de-serializes the data 112 for communication back to the core(s) 108.

The PHY 118 consumes power when serializing the data 112. The concepts and technologies disclosed herein enable the PHY 118 to minimize power consumption by implementing FIFOs designed to be toggled on-demand when there is a data payload (e.g., the data 112) to be written/read. Additional details in this regard will be described below with reference to FIG. 3 and FIG. 4.

In the illustrated example, the memory controller 114 also issues commands 126 directed to the memory subsystem 104, which is configured to receive the commands 126 over the DRAM interface 106 via a command bus 128. The commands 126 are specific control signals or instructions sent to the memory subsystem 104 to perform a particular memory operation. The memory commands 126 are low-level commands that directly interact with the memory controller 114 or the memory subsystem 104 to initiate a memory operation. Memory commands are often specific to the memory technology being used, such as DDR memory, where commands like READ, WRITE, PRECHARGE, and ACTIVATE are used to control access to the DDR memory.

Figure 2:
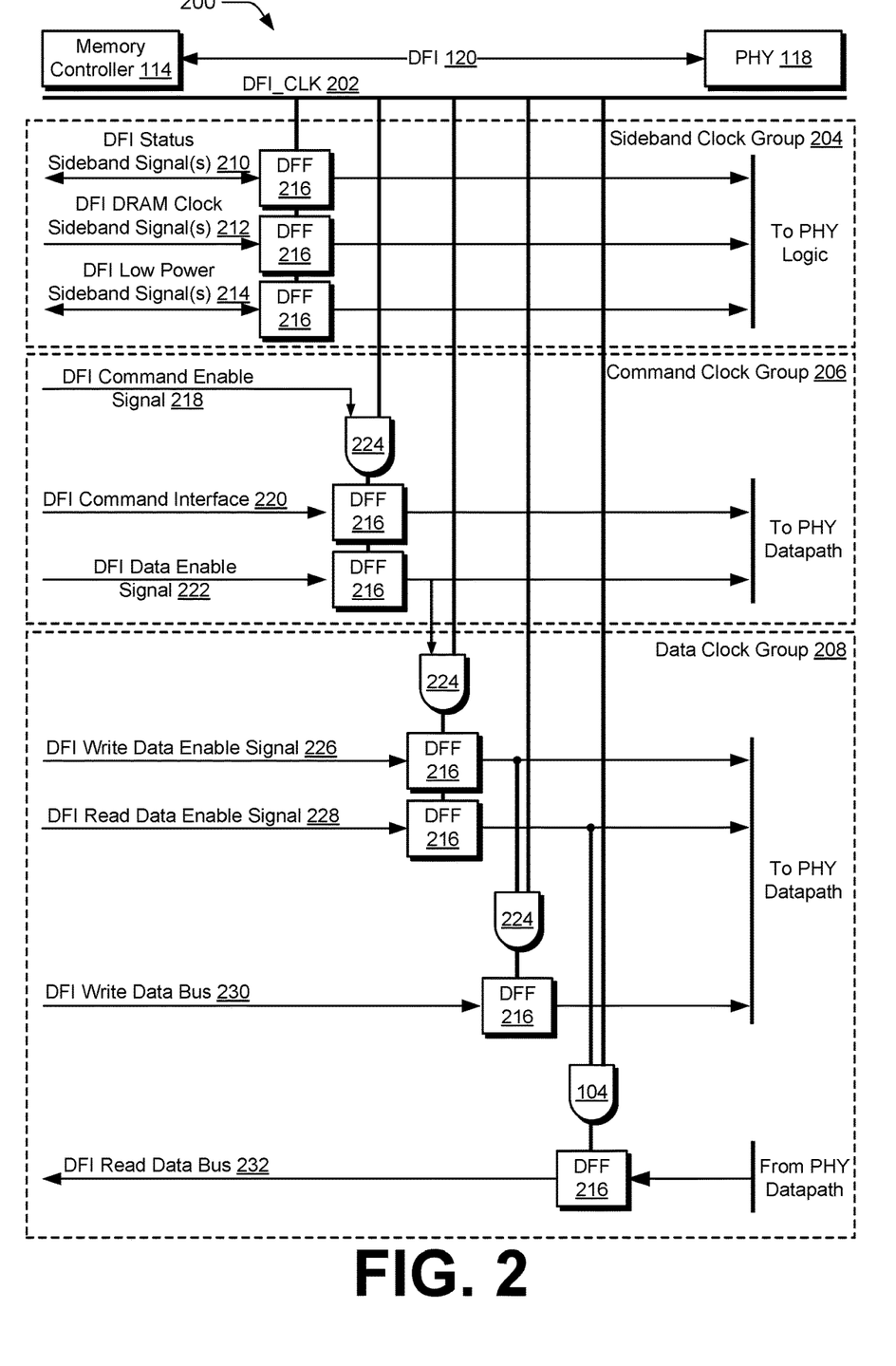
FIG. 2 depicts a clocking hierarchy that allows for toggle reduction within a physical layer interface with minimal impact to turnaround latency to achieve, at least in part, a desired performance, power, and area target.

FIG. 2 is a waterfall diagram depicting a non-limiting example clocking hierarchy 200 that allows for toggle reduction within the PHY 118 with minimal impact to turnaround latency to achieve, at least in part, a desired power, performance, and area target. On the left side, the clocking hierarchy 200 depicts the memory controller 114, and on the right side, the clocking hierarchy 200 depicts the PHY 118 and associated logic and data path. The clocking hierarchy 200 demonstrates how specific parts of the PHY data path are enabled or disabled using different clocks. Overall, the clocking hierarchy 200 provides a detailed representation of how clocking and power management are implemented to control different parts of the PHY data path based on the operation being performed and the power-saving state of the system.

In the illustrated example, the clocking hierarchy 200 shows a DFI clock 202 (DFI_CLK) associated with the DFI 120 between the memory controller 114 and the PHY 118. The DFI clock 202 is divided into multiple gated clock groups or domains, referred to herein as a sideband clock group 204, a command clock group 206, and a data clock group 208.

The sideband clock group 204 is monitored by the PHY 118. In some implementations, the sideband clock group 204 is always active. The sideband clock group 204 handles sideband signals that accompany the main data and command signals but are not directly involved in typical read/write operations. In the illustrated example, one or more DFI status sideband signals 210, one or more DFI DRAM clock sideband signals 212, and one or more DFI low power sideband signals 214 are shown.

The DFI status sideband signal(s) 210 are used by the DFI 120 to communicate the current state of the DFI 120, conditions experienced by the DFI 120, and/or any other events of interest to be shared with the memory controller 114. For example, the DFI sideband signal(s) 210, in various implementations, are configured to convey to the memory controller 114: a training status indicating the outcome or progress of various training sequences, such as read or write leveling, gate training, and/or data eye centering; error indicators that convey any errors during transactions, possibly due to signal integrity issues or other PHY-related problems; power management feedback that provides feedback about the actual power state (e.g., low power state or high power state) of the PHY 118; operational status that indicates whether the PHY is in an idle state, an active state, or in some specific mode of operation; thermal alerts that provide feedback to the memory controller 114 if certain temperature thresholds are crossed; and calibration feedback used to report back on periodic calibration routines, which, in some implementations, are automatically executed by the PHY 118 to maintain optimal signal integrity.

The DFI DRAM clock sideband signals 212 are used by the DFI 120 to handle management and status of the clock signals between the memory controller 114 and the PHY 118. For example, the DFI DRAM clock sideband signals 212, in various implementations, include: dfi_clk (e.g., DFI clock 202), which is the primary clock signal to which both the memory controller 114 and the PHY 118 operate synchronously; dfi_half_clk, which runs at half the frequency of dfi_clk and is used in certain modes of operation and/or for specific training sequences; dfi_clk_enable, which, when asserted, indicates that dfi_clk is stable and is to be used for sampling DFI signals, and when not asserted, indicates that dfi_clk is not stable and is not to be used for sampling DFI signals; dfi_clk_ungated, which indicates when the internal clock of the PHY 118 is running and is used by the memory controller 114 to determine when the PHY 118 is in a low-power state; dfi_dram_clk_disable, which indicates if DRAM device(s) 110 clock(s) are gated or running; dfi_freq_ratio, which indicates the current frequency ratio at which the DRAM device(s) 110 are operating (e.g., when the DRAM device(s) 110 support different operating speeds); dfi_init_start, which is asserted by the memory controller 114 to initiate the PHY 118 initialization sequence; and dfi_reset_n, which is an active-low reset signal that puts the DFI 120 into a known reset state.

The DFI low power sideband signals 214 are used by the DFI 120 to manage low power states. For example, the DFI low power sideband signals 214, in various implementations, include: dfi_lp_mode_req, which is a signal used by the memory controller 114 to request the PHY 118 to enter a particular low-power state; dfi_lp_mode_ack, which is a signal used by the PHY 118 to acknowledge a request received from the memory controller 114 to enter a low-power state; dfi_lp_wakeup_req, which is a signal used by the memory controller 114 to wake up the PHY 118 out of a low-power state; dfi_lp_data_req and dfi_lp_data_ack, which are signals associated with determining if the data clock group 208 can be placed in low power state; and dfi_lp_ctrl_req and dfi_lp_ctrl_ack, which indicate if command clock group 206 can be placed in low power state.

The DFI status sideband signal(s) 210 connect into one or more D-type flip-flops (DFFs) 216 (one DFF 216 in the illustrated example). The DFFs 216 are configured to perform various operations, such as signal sampling, edge detection, debouncing, and synchronization. Connecting the DFI status sideband signal(s) 210 to the DFF(s) 216 aligns the timing of these signals with operations of the memory controller 114, ensuring data integrity and facilitating accurate system-level responses to various PHY states or events.

The DFI DRAM clock sideband signals 212 also connect to one or more DFFs 216 (one DFF 216 in the illustrated example). The DFFs 216, in this context, ensure precise sampling, synchronization, and monitoring of the DRAM clock signal, enabling the memory controller 114 to make informed decisions or operations based on the state or transitions of the DRAM clock.

The DFI low power sideband signals 214 also connect to one or more DFFs 216 (one DFF 216 in the illustrated example). In this context, the DFFs 216 ensure that signal transitions and states are captured synchronously, aligned with the primary interface clock. This ensures accurate, timely, and glitch-free communication between the memory controller 114 and the PHY 118 during low power operations.

The command clock group 206 handles signals related to memory commands (e.g., the commands 126) issued by the memory controller 114 to the DRAM device(s) 110. The command clock group 206 is enabled when the commands 126 are to be sent and is disabled otherwise. In the illustrated example, a DFI command enable signal 218, DFI command interface 220, and a DFI data enable signal 222 (i.e., dfi_data_en) are shown.

The DFI command enable signal 218 (i.e., dfi_command_en) is used to indicate when valid command and control signals are presented on the command interface 220. When DFI command enable signal 218 is asserted, it signifies that the command and control signals (e.g., address, bank, and command type) on the DFI command interface 220 are valid and should be sampled by the PHY 118. When it is de-asserted, the PHY 118 should not interpret changes on the command signals.

In the illustrated example, an integrated clock gating (ICG) cell 224 is shown with one input being the DFI command enable signal 218 and another input being the DFI clock 202 (DFI_CLK). The ICG cell 224 gates access to the DFI command interface 220 and the DFI data enable signal 222. If the DFI command enable signal 218 is not asserted, then the DFI command interface 220 and the DFI data enable signal 222 are inaccessible.

The DFI command interface 220 includes multiple signals that together convey information used to issue the commands 126 to the DRAM devices 110. For example, the DFI command interface 220 includes: a dfi_address signal that carries the memory address for a given command 126; a dfi_command signal that represents the type of command 126 being issued (e.g., read, write, activate, or precharge); a chip select signal (i.e., dfi_cs_n) that enables a particular memory device (e.g., one of the DRAM devices 110 or rank within); a clock enable signal (i.e., dfi_cke) signal that enables a clock; an on-die termination control signal (i.e., dfi_odt); and a reset signal (i.e., dfi_reset_n). When a command 126 is to be conveyed from the memory controller 114 to the PHY 118, the relevant signals in the DFI command interface 220 are set accordingly. The DFI command enable signal 218 (i.e., dfi_command_en signal), as explained earlier, is then used to present these command signals to the PHY 118 for sampling.

The DFI data enable signal (i.e., dfi_data_en) 222 indicates when valid read or write data (e.g., the data 112) are presented on the data bus 124. When the DFI data enable signal 222 is asserted, it signifies that the data bus 124 carries valid data to be written to the DRAM device(s) 110. The PHY 118 samples the data 112 and passes the data 112 to the DRAM device(s) 110 during a write command of the commands 126. For read operations, assertion of the DFI data enable signal 222 indicates that read data is available on the data bus 124 of the PHY 118, the data 112 is valid, and the data 112 is available to be captured by the memory controller 114.

The data clock group 208 handles signals related to data transfers that are synchronized to a particular clock domain. The data clock group 208 in memory interfaces ensures that data-related signals are sampled, driven, and interpreted correctly, synchronized with the specific data clock domain. This synchronization ensures reliable data transfers, especially given the high speeds and tight timings of modern DDR systems. In the illustrated example, a DFI write data enable signal 226 (i.e., dfi_wrdata_en) and a DFI read data enable signal (i.e., dfi_rddata_en) 228, are shown.

In the illustrated example, an ICG cell 224 is shown with one input being the DFI data enable signal 222 from the command clock group 206 and another input being the DFI clock 202 (DFI_CLK). Here, the ICG cell 224 gates access to the DFI write data enable signal 226 (i.e., dfi_wrdata_en) and the DFI read data enable signal (i.e., dfi_rddata_en) 228. If the DFI data enable signal 222 is not asserted, then the DFI write data enable signal 226 (i.e., dfi_wrdata_en) and the DFI read data enable signal (i.e., dfi_rddata_en) 228 are inaccessible.

The DFI write data enable signal 226 is used to indicate when valid write data is presented on a DFI write data bus 230 (i.e., dfi_wrdata and its associated signals). When a write operation is to be executed to the DRAM device(s) 110, the memory controller 114 places the data 112 to be written on a DFI write data bus 230 (i.e., dfi_wrdata). To signal to the PHY 118 that the data 112 is valid and should be taken for a write operation, the memory controller 114 asserts (sets to a high or active state) the DFI write data enable signal 226 (i.e., dfi_wrdata_en). Upon seeing the DFI write data enable signal 226 asserted, the PHY 118 knows to sample the data 112 from the DFI write data bus 230 and continue to write the data 112 to the DRAM device(s) 110. The assertion of the DFI write data enable signal 226 is tightly coordinated with other DFI signals, such as the command signals described above, to ensure that the write operation is executed accurately.

The DFI read data enable signal 228 is used by the PHY 118 to instruct the memory controller 114 that valid read data is available on a DFI read data bus 232 (i.e., dfi_rddata and its associated signals). After the memory controller 114 issues a read command, the data 112 from the DRAM device(s) 110 is fetched by the PHY 118. Once the PHY 118 has the data 112 ready to be sent to the memory controller 114, the PHY 118 places the data 112 on the DFI read data bus 232. The PHY 118 then asserts (sets to a high or active state) the DFI read data enable signal 228 to notify the memory controller 114 that the data 112 on the DFI read data bus 232 is valid and should be accepted.

Figure 3:
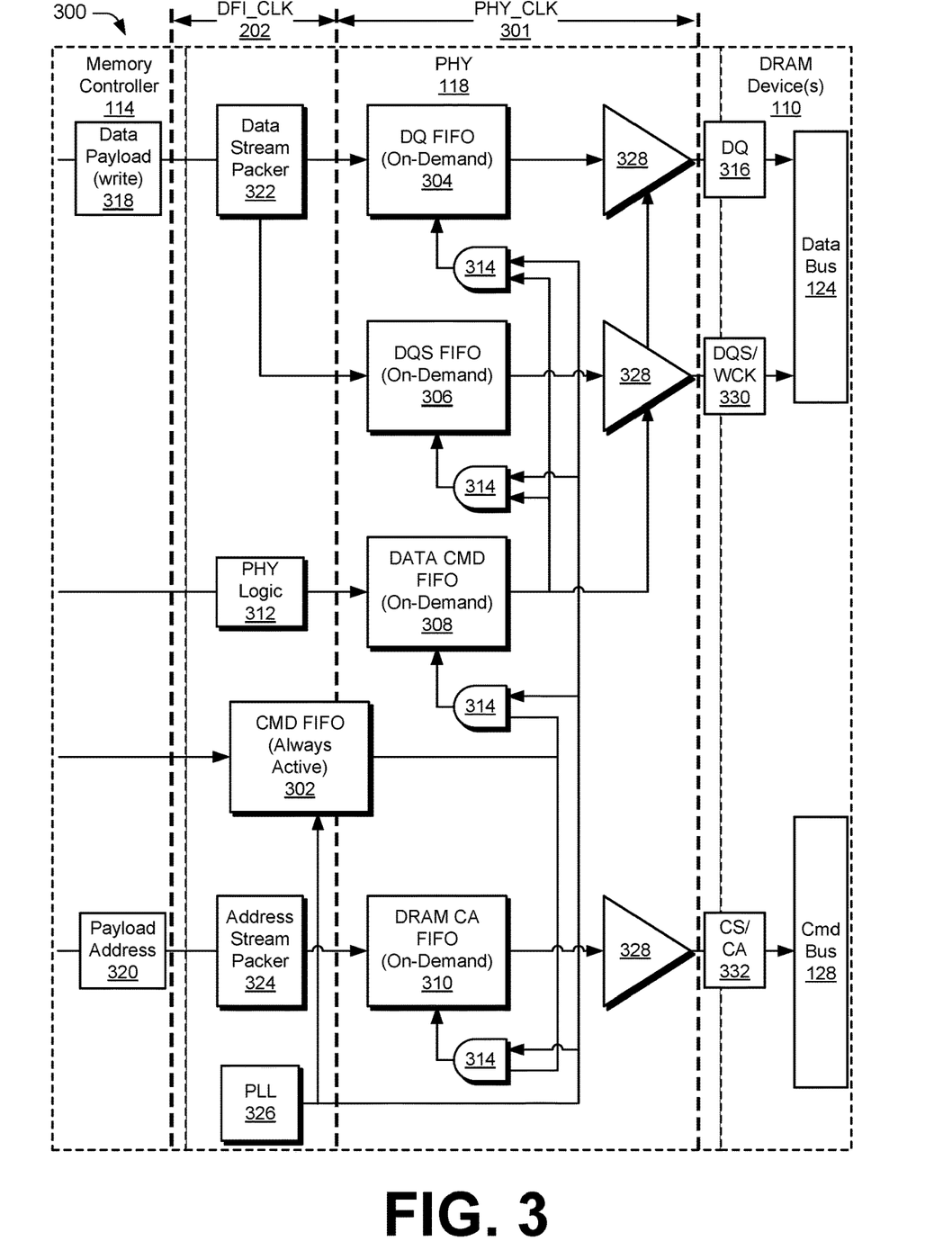
FIG. 3 depicts a non-limiting example physical layer interface configuration for implementing a write operation.

FIG. 3 depicts a non-limiting example PHY configuration 300 of the PHY 118 that utilizes a single active FIFO and multiple on-demand FIFOs for implementing a write operation in accordance with the techniques described herein to achieve, at least in part, a desired PPA target for the system 100. Inside the illustrated PHY 118 are two distinct clock domains—a memory controller speed (i.e., DFI clock 202) and a PHY serialization clock (i.e., PHY clock 301). To achieve the PPA target, two types of FIFO buffers (hereafter "FIFOs") are implemented.

A first FIFO type is an active FIFO for handling commands 126 and signals (see FIG. 2) from the memory controller 114 via the DFI 120. The first FIFO type will be described herein as "always active" to denote that it is powered when the system 100 is powered-on, e.g., the always active FIFO is constantly powered on. In the illustrated example, an always active command FIFO 302 (shown as "CMD FIFO (Always Active)") is shown as an example of the first FIFO type. A second FIFO type is an on-demand FIFO for handling payloads from the memory controller 114 to be written to the DRAM device(s) 110. The on-demand FIFO is disabled (i.e., not powered on) until enabled by the always active FIFO. More specifically, the always active FIFO is configured to trigger or control operation of the on-demand FIFOs, including enabling or disabling the on-demand FIFOs via an enable or disable command or signal.

In the illustrated example, an on-demand data FIFO 304 (shown as "DQ FIFO (On-Demand)"), an on-demand data strobe FIFO 306 (shown as "DQS FIFO (On-Demand)"), an on-demand data command FIFO 308 (shown as "DATA CMD FIFO (On-Demand)"), and an on-demand DRAM command/address FIFO 310 (shown as "DRAM CA FIFO (On-Demand)") are shown as examples of the second FIFO type.

Inside the aforementioned FIFOs are read pointer logic and write pointer logic. Power is saved in the on-demand FIFOs (e.g., on-demand FIFOs 304, 306, 308, and 310) by only enabling the FIFO clocks for the exact number of read/write commands to be processed. In an idle state, only the always active command FIFO 302 is active. This allows the PHY 118 to use less power and increase overall power efficiency of the system 100.

PHY logic 312 is configured to operate when there is either an active read or write operation. In such scenarios, a cascaded FIFO scheme is employed. In this scheme, the on-demand data command FIFO 308 sits downstream from the always active command FIFO 302. The always active command FIFO 302 is enabled for a specific number of cycles on a read or write operation. For example, a write operation is initiated by assertion of the DFI write data enable signal 226 (i.e., dfi_wrdata_en) to the PHY 118. The DFI write data enable signal 226 is received on the command clock group 206 and is sent to the always active command FIFO 302. The output of the always active command FIFO 302 enables the clock (via an illustrated AND gate 314) for the on-demand data command FIFO 308 at a specific time for a specific number of clocks that allows for each on-demand data FIFO, such as the on-demand DQ FIFO 304, to transmit the desired data (DQ) 316 to the DRAM device(s) 110 via the data bus 124. However, each data (DQ) lane (only one shown), in some scenarios, implements a coarse clock cycle of delay to optimize the DDR data write eye at the DRAM device(s) 110.

To maintain the desired clock gating and allow for coarse clock delay implementation, FIFO data framing is used. In other words, data burst length written into each on-demand DQ FIFO 304 (again, one shown in the illustrated example) is manipulated with a different number of pre-post curser filler data such that data read from the on-demand DQ FIFO 304 will have the desired coarse delay. This scheme allows for exactly controlling the "on" time window of any on-demand FIFO, which itself is controlled, at times, by another FIFO upstream. This technique is used when it is desirable to change when each FIFO is to be read to compensate for differences in DRAM and PHY channel characteristics, and/or changes in timing due to voltage and temperature drifts in the SoC 102 or the DRAM device(s) 110.

Returning to the memory controller 114 side of the illustrated PHY write configuration 300, data payload 318 and an associated payload address 320 are shown. The data payload 318 includes, for example, at least a portion of the data 112 that is to be written to the DRAM device(s) 110. The payload address 320 is the memory address within the DRAM device(s) 110 to which the data payload 318 is to be written.

The data payload 318 is received by a data stream packer 322, which feeds the on-demand DQ FIFO 304 and the on-demand DQS FIFO 306. The data stream packer 322 is a digital circuit or module responsible for aggregating multiple smaller data items into a larger composite item or packet. The data stream packer 322 is designed to enhance the efficiency of data transfer by packing the data payload 318 more densely and/or by organizing the data payload 318 in a way that is better suited for subsequent processing or transmission, such as by the on-demand DQ FIFO 304 and the on-demand DQS FIFO 306.

The payload address 320 is received by an address stream packer 324, which feeds the on-demand DRAM CA FIFO 310. The address stream packer 324 is a digital circuit or module responsible for aggregating multiple addresses into a larger composite address package. The address stream packer 324 is designed to enhance the efficiency of address transfer by packing the payload addresses 320 together. For example, the address stream packer 324 packs the individual payload addresses corresponding to the items within the data payload 318.

A phase-locked loop (PLL) 326 is also shown in the illustrated example. The PLL 326 generates and maintains a precise and stable clock signal. This clock signal is used for synchronizing data transfers and other operations between the PHY 118 and the DRAM device(s) 110. The PLL 326 connects to the always active command FIFO 302 and provides a clock signal to each of the AND gates 314 operating upstream from the on-demand FIFOS 304, 306, 308, 310.

Outputs of the on-demand FIFOs 304, 306, 308, 310 are provided to amplifiers 328. For example, the DQ 316 output from the on-demand DQ FIFO 304 passes through an amplifier 328 before being placed on the data bus 124 for the DRAM device(s) 110; a DQS/WCK 330 output from the on-demand DQS FIFO 306 passes through another amplifier 328 before being pass on to the data bus 124 for the DRAM device(s) 110; and a CS/CA 332 output from the on-demand DRAM CA FIFO 310 passes through another amplifier 328 before being passed on to the command bus 128 for the DRAM device(s) 110. Other connectivity among the amplifiers 328 is also shown.

Figure 4:
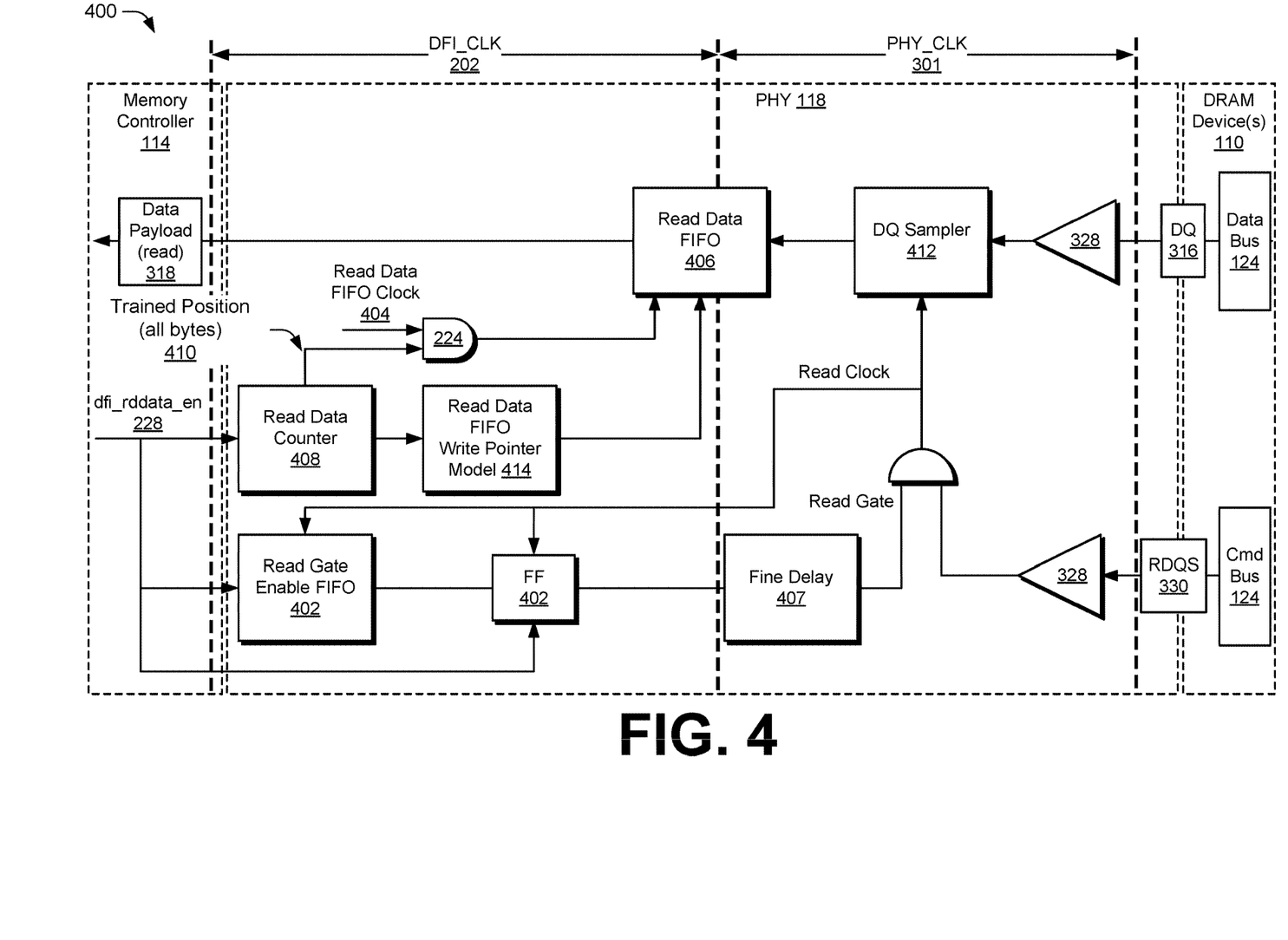
FIG. 4 depicts a non-limiting example physical layer interface configuration for implementing a read operation.

FIG. 4 depicts another non-limiting example PHY configuration 400 of the PHY 118 that utilizes a special read gate enable FIFO for implementing a read operation in accordance with the techniques described herein to achieve, at least in part, a desired PPA target. The memory controller 114, the PHY 118, and the DRAM device(s) 110 are shown. As in FIG. 3, two distinct clock domains—a memory controller speed (i.e., DFI clock 202) and a PHY serialization clock (i.e., PHY clock 301)—are also shown.

Once a read command issues, un-gating the read clock introduces two challenges to the PHY 118. The first challenge is that, in some cases, the DRAM device(s) 110 have long read latencies and it is desirable to save as much dynamic power as possible. The second challenge is that the start of a read burst arriving at the PHY 118 is a trained asynchronous position. The PHY configuration 400 implements a read gate enable FIFO 402 to solve these challenges.

When the PHY 118 receives a DFI read data enable signal (shown as "dfi_rddata_en") 228 from the memory controller 114, the PHY 118 ungates (via an ICG cell 224) a read data FIFO clock 404 and places the DFI read data enable signal 228 into the read gate enable FIFO 402. The DFI read data enable signal 228 leaves the read gate enable FIFO 402 at the exact trained position corresponding to the start of the read burst at the PHY 118. This solves the second challenge while keeping a read data FIFO 406 gated to meet the first challenge.

The PHY configuration 400 also includes a fine delay block 407 that is used to fine-tune the timing of the DFI read data enable signal 228 received from the read gate enable FIFO 402. This ensures synchronization with the data payload 318 being read. The fine delay block 407 is used to tune the "set" position of the read gate signal to just before the first RDQS edge arrives.

Additionally, the DFI read data enable signal 228 triggers a read data counter 408. The value of the read data counter 408 is trained such that, when expired, the data payload 318 is safely read from the read data FIFO 406 from all the bytes (shown as "trained position (all bytes) 410") associated with the DRAM channel. This is done by calculating a theoretical minimum and increasing a count value until the write and read data matches within a margin.

Moreover, depending on several factors and implementation decisions, valid data, at times, sits at a different position within the read data FIFO 406. Example factors include DQ sampling implementations (e.g., via a DQ sampler 412), read data FIFO write logic implementations (e.g., via a read data FIFO write pointer model 414), and RDQS pre-amble and post-amble selection driven implementations, as well as variations in timing between different DRAMs in the same logical channel. The pre-amble and post-amble choices introduce extra RDQS edges that create "garbage" data entries in the read data FIFO 406. The read data FIFO write pointer model 414 knows where the garbage data sits and filters this data out before sending the garbage data upstream to the memory controller 114.

These implementations are driven by signal integrity requirements at high data rates and the desire to abstract these challenges from upstream logic. Thus, the PHY configuration 400 includes the read data FIFO write pointer model 414 of the read data FIFO write pointer value based on the previous pointer position. This allows the PHY 118 to know exactly which entry in the read data FIFO 406 has the data payload 318 requested by the memory controller 114. The read data FIFO clock 404 is then enabled only for the minimum number of cycles needed to read the data payload 318 and to send the data payload 318 to the memory controller 114.

The combination of the read data counter 408 and the read data FIFO write pointer model 414 allows the PHY 118 to only enable the read data FIFO clock 404 to the read data FIFO 406 for a minimum number of cycles to solve the first challenge described above.

Figure 5:
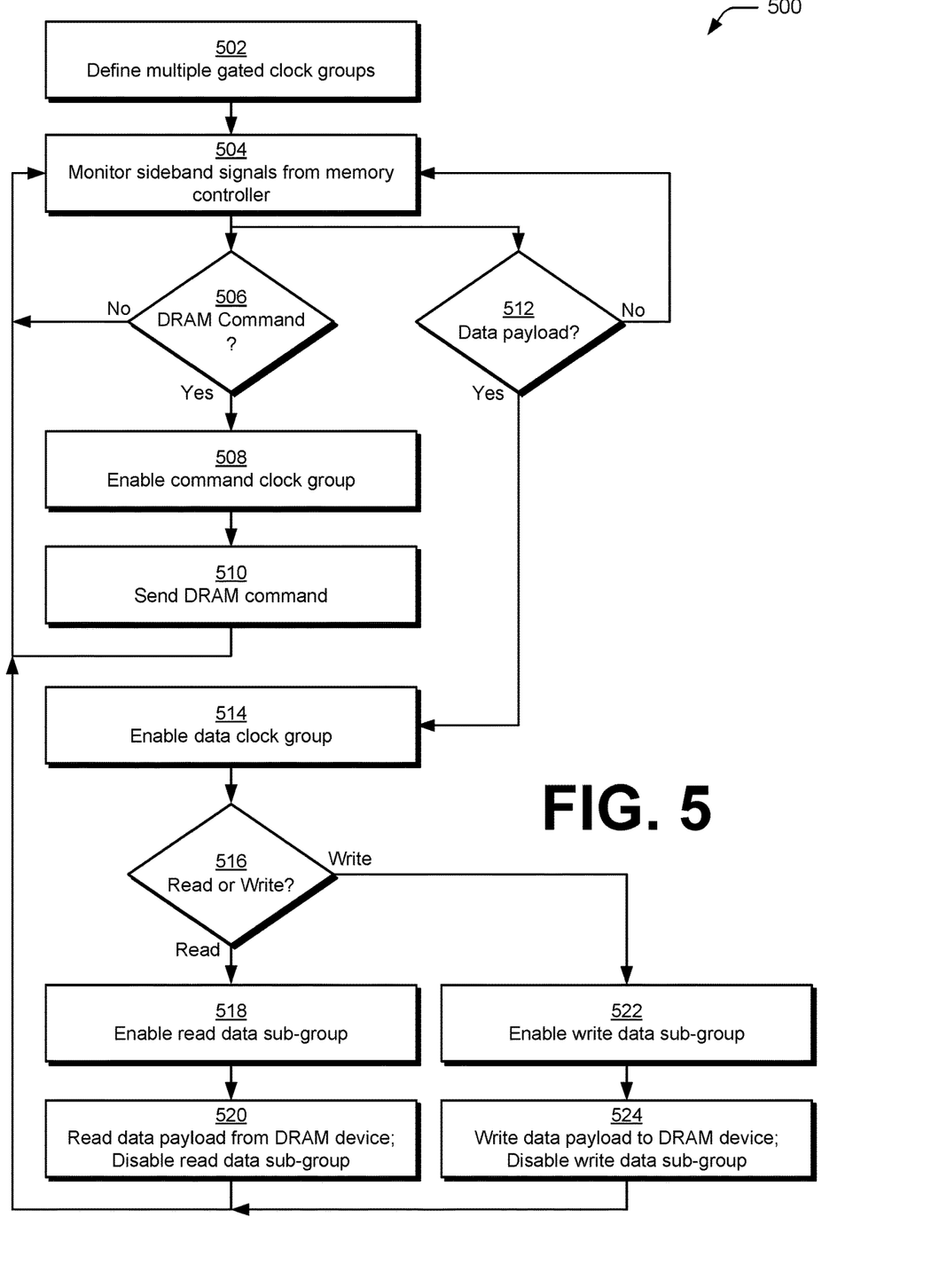
FIG. 5 depicts a method for fine-grained clocking and clock distribution within a physical layer interface.

FIG. 5 depicts a method 500 for fine-grained clocking and clock distribution within the PHY 118. The method 500 begins and proceeds to block 502. At block 502, the multiple gated clock groups are defined. For example, as shown in FIG. 2, the DFI clock 202 is divided into the sideband clock group 204, the command clock group 206, and the data clock group 208. From block 502, the method 500 proceeds to block 504. At block 504, the PHY 118 monitors the sideband signals received from the memory controller 114 within the sideband clock group 204. From block 504, the method 500 proceeds to block 506.

At block 506, the PHY 118 determines if a DRAM command (e.g., a read command or a write command) is received. If so, the method proceeds to block 508. At block 508, the PHY 118 enables the command clock group 206. The method 500 then proceeds to block 510. At block 510, the PHY 118 sends the DRAM command to the DRAM device(s) 110. The method 500 then returns to block 504 and continues as described above. If, however, at block 506, the PHY 118 determines if no DRAM command is received, the method 500 returns to block 504 and continues as described above.

Returning to block 504, the method 500 also proceeds to block 512. In other words, the memory controller 114, in some instances, sends a DRAM command while a read or write payload is in flight. Thus, the memory controller 114 monitors independently for both DRAM commands (block 506) and data payloads (block 512). At block 512, the PHY 118 determines if a data payload 318 (e.g., containing the data 112) is available to be sent to or retrieved from the DRAM device(s) 110. If not, the method 500 returns to block 504 and continues as described above. If so, the method 500 proceeds to block 514.

At block 514, the PHY 118 enables the data clock group 208. From block 514, the method 500 proceeds to block 516. At block 516, the PHY 118 determines whether the data payload 318 is associated with a read operation or a write operation.

If the PHY 118 determines that the data payload 318 is associated with a read operation, the method 500 proceeds to block 518. At block 518, the PHY 118 enables a read data sub-group (e.g., the group FIFO(s) configured to handle read requests as depicted in FIG. 4). From block 518, the method 500 proceeds to block 520. At block 520, the PHY 118 uses the read data sub-group to read the data payload 318 from the DRAM device(s) 110. At block 520, the PHY 118 also disables the read data sub-group. The method 500 then returns to block 504 and continues as described above.

If the PHY 118 determines that the data payload 318 is associated with a write operation, the method 500 proceeds to block 522. At block 522, the PHY 118 enables a write data sub-group (e.g., the group of FIFO(s) configured to handle write requests as depicted in FIG. 3). From block 522, the method 500 proceeds to block 524. At block 524, the PHY 118 uses the write data sub-group to write the data payload 318 to the DRAM device(s) 110. At block 524, the PHY 118 also disables the write data sub-group. The method 500 then returns to block 504 and continues as described above.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein, including, where appropriate, the system 100, the SoC 102, the DRAM interface 106, the core(s) 108, the DRAM device(s) 110, the memory controller 114, the scheduler 117, the PHY 118, the DFI 120, the interconnect 122, the data bus 124, the command bus 128, the DFFs 216, the ICG cells 224, the various FIFOs, and/or other components of the PHY 118 are implemented in any of a variety of different manners such as subsystem circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
   a memory device;
   a memory controller; and
   a physical layer interface that connects the memory device and the memory controller, the physical layer interface including:
   an active first-in-first-out buffer configured to receive commands from the memory controller; and
   an on-demand first-in-first-out buffer configured to be selectively enabled by the active first-in-first-out buffer to handle a data payload received from the memory controller, wherein the active first-in-first-out buffer is configured to enable or disable the on-demand first-in-first-out buffer by communicating an enable or disable command to the on-demand first-in-first-out buffer.

2. The system of claim 1, wherein the active first-in-first-out buffer is powered when the system is powered-on.

3. The system of claim 2, wherein the on-demand first-in-first-out buffer is disabled until enabled by the active first-in-first-out buffer.

4. The system of claim 1, wherein the physical layer interface further comprises a plurality of on-demand first-in-first-out buffers including the on-demand first-in-first-out buffer.

5. The system of claim 4, wherein an output of the active first-in-first-out buffer enables a clock signal for one or more of the plurality of on-demand first-in-first-out buffers.

6. The system of claim 5, further including a phase locked loop configured to generate the clock signal.

7. The system of claim 1, wherein the physical layer interface is configured to, responsive to determining that the data payload is associated with a write operation, cause the active first-in-first-out buffer to enable one or more write data first-in-first-out buffers configured to handle write requests, the one or more write data first-in-first-out buffers including the on-demand first-in-first-out buffer.

8. The system of claim 1, wherein the physical layer interface is configured to, responsive to determining that the data payload is associated with a read operation, cause the active first-in-first-out buffer to enable one or more read data first-in-first-out buffers configured to handle read requests, the one or more read data first-in-first-out buffers including the on-demand first-in-first-out buffer.

9. The system of claim 1, wherein the memory device includes a low power double data rate dynamic random-access memory device, and wherein the memory controller is connected to the physical layer interface via a double data rate to physical layer interface.

10. A physical layer interface comprising:
    an active first-in-first-out buffer configured to receive commands from a memory controller; and
    an on-demand first-in-first-out buffer configured to be selectively enabled by the active first-in-first-out buffer to handle a data payload received from the memory controller, wherein the active first-in-first-out buffer is configured to enable or disable the on-demand first-in-first-out buffer by communicating an enable or disable command to the on-demand first-in-first-out buffer.

11. The physical layer interface of claim 10, wherein the active first-in-first-out buffer is powered.

12. The physical layer interface of claim 10, wherein the on-demand first-in-first-out buffer is disabled until enabled by the active first-in-first-out buffer.

13. The physical layer interface of claim 10, further including a plurality of on-demand first-in-first-out buffers including the on-demand first-in-first-out buffer, and wherein an output of the active first-in-first-out buffer enables a clock signal for one or more of the plurality of on-demand first-in-first-out buffers.

14. The physical layer interface of claim 10, wherein the active first-in-first-out buffer is further configured to:
    enable one or more write data first-in-first-out buffers configured to handle write requests, the one or more write data first-in-first-out buffers including the on-demand first-in-first-out buffer; or
    enable one or more read data first-in-first-out buffers configured to handle read requests, the one or more read data first-in-first-out buffers including the on-demand first-in-first-out buffer.

15. A method comprising:
    defining a sideband clock group, a command clock group, and a data clock group within an interface between a memory controller and a physical layer component;
    monitoring, by the physical layer component, sideband signals received from the memory controller within the sideband clock group;
    selectively enabling the command clock group when the memory controller sends a memory command to the physical layer component; and
    selectively enabling the data clock group when the memory controller writes a data payload to a memory device.

16. The method of claim 15, wherein selectively enabling the data clock group when the memory controller writes the data payload to the memory device includes selectively enabling a write data sub-group within the data clock group, the write data sub-group including one or more on-demand first-in-first-out buffers.

17. The method of claim 15, further including selectively enabling the data clock group when the memory controller reads the data payload from the memory device.

18. The method of claim 17, wherein selectively enabling the data clock group when the memory controller reads the data payload to the memory device includes selectively enabling a read data sub-group within the data clock group, the read data sub-group including one or more on-demand first-in-first-out buffers.

19. The method of claim 15, wherein the memory device includes a low power double data rate dynamic random access memory device.

20. The method of claim 15, wherein the interface includes a double data rate to physical layer interface.

\* \* \* \* \*